United States Patent [19]

Wong et al.

[11] Patent Number: 4,500,600
[45] Date of Patent: Feb. 19, 1985

[54] SIZE COMPOSITION FOR GLASS FIBERS

[75] Inventors: Robert Wong; Martin C. Flautt, both of Granville; Richard M. Haines, Warsaw, all of Ohio

[73] Assignee: Owens-Corning Fiberglas Corporation, Toledo, Ohio

[21] Appl. No.: 1,793

[22] Filed: Jan. 8, 1979

Related U.S. Application Data

[63] Continuation of Ser. No. 790,786, Apr. 25, 1977, abandoned.

[51] Int. Cl.$^3$ ............................................. B32B 9/00
[52] U.S. Cl. ................................. 428/391; 65/3.41; 65/3.43; 427/389.8; 427/386; 428/392; 428/480; 428/429; 428/447; 528/38
[58] Field of Search ............ 65/3 C, 3.41, 3.43; 428/391, 447, 480, 392, 375, 378, 429; 427/387, 389, 8, 386; 528/38; 260/29.2 M

[56] References Cited

U.S. PATENT DOCUMENTS 3,702,783  11/1972  Hartlein .......................... 427/215
4,039,716  8/1977   Johnson .......................... 65/3 C Primary Examiner—George F. Lesmes
Assistant Examiner—E. Rollins Buffalow
Attorney, Agent, or Firm—Ronald C. Hudgens; Greg Dziegielewski

[57] ABSTRACT

Glass fibers coated with a size composition comprising gamma-aminopropyltriethoxysilane and an alkoxysilane are disclosed. When a glass fiber size composition of this invention is employed on glass fibers incorporated into plastics reinforced by the incorporation of the fibers, the resulting product exhibits improved strength properties.

11 Claims, No Drawings

SIZE COMPOSITION FOR GLASS FIBERS

This is a continuation of application Ser. No. 790,786, filed Apr. 25, 1977 now abandoned.

This invention relates to glass fibers.

More specifically, this invention relates to size compositions for glass fibers.

In one of its more specific aspects, this invention relates to a combination of silanes for glass fiber size compositions.

The employment of organo-functional silanes in size compositions for glass fibers used to produce glass fiber reinforced plastics is well known. The employment of an organo-functional silane serves to improve bonding between the glass fiber surface and the organic polymer matrix into which the glass fiber is incorporated.

Also known in the art is the improvement in glass-resin bonding achieved by the employment of a blend of an epoxysilane (an organo-functional silane) and a methyltrialkoxysilane. See U.S. Pat. No. 3,702,783.

The present invention provides a combination of silanes which combination when employed in a size composition facilitates a further improvement in the shear strength properties of glass fiber reinforced plastics.

According to this invention, there is provided at least one glass fiber at least a portion of the surface of which is in contact with a residue produced by removing water from an aqueous composition comprising gamma-aminopropyltriethoxysilane and an alkoxysilane.

Also, according to this invention there is provided an aqueous composition comprising gamma-aminopropyltriethoxysilane and an alkoxysilane.

According to this invention, there is also provided a method for producing glass fiber reinforced plastics which comprises coating glass fibers with an aqueous composition comprising gamma-aminopropyltriethoxysilane and an alkoxysilane and incorporating the resulting coated fibers into an organic polymer matrix.

The combination of silanes of this invention can be employed in any suitable aqueous size composition. Generally, the combination will be employed in a size composition which can also comprise film-formers, lubricants, surfactants, emulsifiers and the like.

In a preferred embodiment, the combination of silanes of this invention will be employed in an aqueous size composition which comprises a film-former and at least one lubricant.

The gamma-aminopropyltriethoxysilane employed as the organo-functional silane is commercially available from Union Carbide under the designation "A-1100".

Gamma-aminopropyltriethoxysilane will be employed in a size composition in an amount within the range of from about 0.1 to about 1 percent by weight of the aqueous size composition.

Any suitable alkoxysilane can be employed in the practice.

Particularly suitable alkoxysilanes are methyltrimethyoxysilane, designated "Z-6070", phenyltrimethoxysilane, designated "Z-6071", methylphenyldimethoxysilane, designated "Z-6073" and diphenyldimethoxysilane, designated "Z-6074", all commercially available from Dow Corning.

The alkoxysilane will be employed in a size composition in an amount within the range of from about 0.1 to about 1 percent by weight of the aqueous size composition.

The size compositions are prepared by conventional methods such as described below. The size compositions can be applied to any glass fiber, being applied during the forming operation using any suitable applicator such that the fibers possess, upon drying, a solids content within the range of from about 0.4 to about 2 percent by weight of the sized fiber, as determined by loss on ignition.

EXAMPLE I

This example demonstrates the best mode for the preparation of about 0.100 gallons of a size composition containing a combination of silanes according to this invention.

About 500 pounds of deionized water were added to the main mix tank with agitation at room temperature.

About 1.3 pounds of gamma-aminopropyltriethoxysilane ("A-1100") were diluted with 25 pounds of deionized water with agitation and then, introduced into the main mix tank. The contents of the main mix tank were agitated for about ½ hour.

About 69.5 pounds of an epoxy emulsion ("AD-501" described below) and about 70 pounds of deionized water were added to a first premix vessel, agitated until completely in solution and introduced into the main mix tank.

About 11.5 pounds of a first lubricant "Emery 7440", about 6 pounds of a second lubricant "PVP-K-90" (both described below) and about 50 pounds of deionized water were added to a second premix vessel with agitation. The contents of the second premix vessel were then introduced into the main mix tank with agitation.

Next, about 2 pounds of methyltrimethoxysilane ("Z-6070") were introduced into the main mix tank with agitation.

The contents of the main mix tank were recovered as a size composition of this invention and found to have a pH of about 5 and a solids content of about 6.25 to about 6.75 percent.

"AD-501" is an epoxy emulsion comprising "DER-337" epoxy resin, commercially available from Dow Chemical and a combination of non-ionic lubricants designated by the tradename "Igepal," commercially available from GAF Corporation. "AD-501" epoxy emulsion is commercially available from Owens-Corning Fiberglas Corporation.

"Emery 7440" lubricant is non-ionic and is a mixture containing an amide/ester antistatic agent, a non-ionic emulsifier and mineral oil and is commercially available from Emery Industries.

"PVP-K-90" is polyvinylpyrrolidone commercially available from General Aniline Corporation.

EXAMPLE II

This example is included for comparative purposes and demonstrates a size composition which employs the combination of silanes taught in the Example of U.S. Pat. No. 3,702,783.

A size composition was prepared using substantially the same procedures of Example I with the exception that about 1.3 pounds of 3-glycidoxypropyltrimethoxysilane were substituted for the gamma-aminopropyltriethoxysilane.

EXAMPLE III

The size compositions of Example I and Example II were separately applied to continuous filament glass fibers having an average diameter of about 0.00036 inch using a roll applicator and the sized filaments were separately collected into strands. Using substantially the same procedures, the strands coated with the size composition of Example I and the strands coated with the size composition of Example II were separately incorporated into "E-200" polyester resin, commercially available from Owens-Corning Fiberglas Corporation.

The resulting products ("Product A"-reinforced with glass fibers sized with the size composition of Example I and "Product B"-reinforced with glass fibers sized with the size composition of Example II) were tested using the epoxy NOL short-beam shear test (ASTM-D-2291) and found to have the following properties (Table I):

TABLE I

| | Shear Strength (psi) | | |
|---|---|---|---|
| | Dry | Wet | Shear Strength Retention (%)* |
| PRODUCT A | 8,330 | 8,160 | 98.0 |
| PRODUCT B | 5,870 | 2,780 | 47.5 |

*% Shear Strength Retention = $\frac{\text{Wet Shear Strength (psi)}}{\text{Dry Shear Strength (psi)}} \times 100$ It will be seen from the above data that the combination of silanes of the present invention, when employed in size compositions for glass fibers, acts to increase the shear strengths of resulting glass fiber reinforced plastics as compared to prior art silane combinations.

It will be evident from the foregoing that various modifications can be made to the present invention. Such, however, are considered as being within the scope of the invention.

What is claimed is:

1. A glass fiber at least a portion of the surface of which is in contact with a residue produced by removing water from an aqueous composition comprising gamma-aminopropyltriethoxysilane and another alkoxysilane selected from methyltrimethoxysilane, phenyltrimethoxysilane, methylphenyldimethoxysilane and diphenyldimethoxysilane.

2. The glass fiber of claim 1 in which said gamma-aminopropyltriethoxysilane is employed in an amount within the range of from about 0.1 to about 1 percent by weight of said aqueous size composition.

3. The glass fiber of claim 1 in which said alkoxysilane is employed in an amount within the range of from about 0.1 to about 1 percent by weight of said aqueous size composition.

4. The glass fiber of claim 1 in which said alkoxysilane is methyltrimethoxysilane.

5. The glass fiber of claim 1 wherein said gamma-aminopropyltriethoxysilane and said alkoxysilane are each employed in said aqueous composition in an amount within the range from about 0.1 to about 1 percent by weight of said aqueous composition.

6. An aqueous size composition for glass fibers comprising gamma-aminopropyltriethoxysilane and another alkoxysilane selected from methyltrimethoxysilane, phenyltrimethoxysilane, methylphenyldimethoxysilane and diphenyldimethoxysilane.

7. The aqueous size composition of claim 6 in which said alkoxysilane is methyltrimethoxysilane.

8. The aqueous size composition of claim 6 wherein said gamma-aminopropyltriethoxysilane and said alkoxysilane are each employed in an amount within the range from about 0.1 to about 1 percent by weight of said aqueous composition.

9. A method for producing glass fiber reinforced plastics which comprises coating glass fibers with an aqueous composition comprising gamma-aminopropyltriethoxysilane and another alkoxysilane selected from methyltrimethoxysilane, phenyltrimethoxysilane, methylphenyldimethoxysilane and diphenyldimethoxysilane, and incorporating the resulting coated fibers into an organic polymer matrix.

10. The method of claim 9 wherein said gamma-aminopropyltriethoxysilane and said alkoxysilane are each employed in an amount within the range from about 0.1 to about 1 percent by weight of said aqueous composition.

11. The method of claim 9 wherein said organic polymer is a polyester resin.

* * * * *